United States Patent [19]

Schmid et al.

[11] Patent Number: 4,511,684
[45] Date of Patent: Apr. 16, 1985

[54] FLAME RETARDANT POLYAMIDES AND AGENT FOR INDUCING FLAME RETARDANCY

[75] Inventors: Eduard Schmid, Bonaduz; Manfred Hoppe, Chur, both of Switzerland

[73] Assignee: Ems-Inventa Ag, Zurich, Switzerland

[21] Appl. No.: 449,850

[22] Filed: Dec. 15, 1982

[51] Int. Cl.³ .................... C08K 5/34; C07D 403/00
[52] U.S. Cl. .................... 524/101; 524/102; 524/103; 524/514; 524/539; 544/198; 544/219; 525/178; 525/183; 525/424; 525/425; 525/432
[58] Field of Search ............... 524/89, 101, 102, 103; 544/183, 184, 192, 190, 198, 219; 525/66, 178, 183, 424, 425, 432; 528/324

[56] References Cited

U.S. PATENT DOCUMENTS

| 4,001,177 | 1/1977 | Tsutsumi et al. | 524/101 |
| 4,232,145 | 11/1980 | Schmid et al. | 528/324 |
| 4,249,004 | 2/1981 | Chono et al. | 544/192 |
| 4,317,764 | 3/1982 | Sheer | 525/66 |
| 4,362,846 | 12/1982 | Korber et al. | 525/66 |

FOREIGN PATENT DOCUMENTS

| 1393551 | 5/1975 | United Kingdom . |
| 1480556 | 7/1977 | United Kingdom . |
| 2003485 | 8/1977 | United Kingdom . |
| 2039505 | 9/1978 | United Kingdom . |

Primary Examiner—John Kight
Assistant Examiner—Kriellion Morgan
Attorney, Agent, or Firm—Jordan B. Bierman

[57] ABSTRACT

The instant invention relates to thermoplastically processable polyamides which are rendered flame retardant by means of a new flame retarding agent; the conversion product of cyanuric acid and triazine compounds having free —$NH_2$ in a molar ratio of at least 2 triazine nuclei per mole of cyanuric acid. The properties of polyamide thermoplasts are changed only slightly through the incorporation of the new flame retarding agent.

14 Claims, 1 Drawing Figure

FIG. 1

FLAME RETARDANT POLYAMIDES AND AGENT FOR INDUCING FLAME RETARDANCY

The instant invention relates to a flame retardant, thermoplastic polyamide composition, the active flame retarding agent contained therein, and a process for its manufacture. In general, polyamide materials are made flame retardant through the addition of halogen-substituted aromatic compounds in association with finely divided antimonic trioxide. The major drawback of this formulation is the generation of halogen hydracid during combustion, a particularly problematical point in these times of strict environmental protection requirements. Furthermore, such halogen hydracids have an extremely corrosive effect on metal components such as electrical switching elements and electronic parts.

Serious attempts were therefore undertaken to find alternative systems with self extinguishing properties without the aforementioned disadvantages.

Thus, the use of cyanuric acid and its low alkyl esters, partly in combination with formamide, was suggested in DE-OS No. 24 53 621 as a flame retarding system for polyamide, whereby only the use of cyanuric acid or formamide was disclosed. The description places particular emphasis on the lack of temperature resistance and the difficult processing conditions. Cyanuric acid can thus be used only with copolyamides, low-melting special polyamides or very low-viscous polyamide 6-types.

In DE OS No. 16 94 254 melamine and melamine substitution products are described as flame retarding agents. These agents influence the mechanical values of the modified polyamide material to only a small degree. The temperature resistance of melamine is good, so that not only polyamide 6 but even polyamide 66—which has to be processed at high temperatures—can be formulated to be self-extinguishing. Even in the presence of glass fibers, the flame retarding properties of the treated polyamide material are improved.

There is no mention in the above-cited DE OS No. 16 94 254 of the high sublimation rate of melamine at temperatures over 250° C., thereby resulting in deposits on the processing tools and production interruptions, nor was there any mention of the high solubility of melamine in warm water.

Due to the relatively high water absorption (for plastic) of polyamide 6 and polyamide 66, the flame retarding agent melamine is washed out of the corresponding finished parts if they are in long lasting contact with water resulting in a loss of the flame retarding effect. In addition, the aforementioned high sublimation rate of melamine causes blooming on the surfaces of molded parts, which in turn influences the electrical properties thereof.

DE OS No. 27 40 092 describes a flame retarding system which circumvents the essential drawbacks of the above-mentioned patent publications. It describes the addition compound of melamine with cyanuric acid in a mole ratio of 1 to 1 as a flame retarding agent. According to this reference, the addition product is of low solubility even in warm water. The product is obtained by mixing aqueous solutions of cyanuric acid and melamine at 90° to 100° C. with agitation followed by filtration of the precipitate. Unfortunately, the temperature resistance provided by this melaminecyanurate is not sufficient for polyamides such as polyamide 66 which are processed at high temperatures. In this context, DE OS No. 27 40 092 states on page 13, lines 6 to 9 "it is advisable to heat material in the molding stage to a temperature under 270° C. and in particular under 250° C. to prevent disintegration of the flame retarding agent". In practice, it has thus become apparent that pure polyamide 66 cannot be modified with melaminecyanurate as a flame retarding agent. To exploit the advantages of melaminecyanurate with polyamide 66, lower-melting copolyamides of polyamide 66 and polyamide 6 were prepared; however, the heat distortion temperature and the stiffness (the specifically advantageous properties of polyamide 66) are very significantly reduced.

Nevertheless, due to its outstanding properties, polyamide 66 is the most popular construction material of the polyamide class, and holds the largest market share. Its advantages are: high heat distortion temperature, particularly in the case of mineral-filled or fiberglass-reinforced materials, fast processing rates, and outstanding mechanical and electrical properties. Therefore, there exists a high demand for a polyamide 66 suited to electrical and electronic applications (i.e. modified without halogen) with good self-extinguishing properties.

DE AS No. 11 73 641 describes the utilization of elemental red phosphorus for the flame retarding of thermoplasts and of polyamide. It proved to be possible to incorporate red phosphorus into polyamide 66 and self-extinguishing properties were achieved. However, special precautionary measures must be taken during manufacture and incorporation with the polyamide on account of the extremely high reactivity of elemental phosphorus. This has led to a wide range of papers dealing with the stabilization, i.e. the reduction of reactivity, of red phosphorus; e.g. U.S. Pat. No. 3,951,908 in which an encapsulation of red phosphorus in caprolactam is described, or the data sheet phosphorus products, EXOLIT 505 of Farbwerke Hoechst, Knapsack works, FRG dated 05/76, in which the processing of such caprolactam-encapsulated red phosphorus with polyamide 66 for the manufacture of flame retardant materials is described. The literature shows that the incorporation must be carried out under inert gas, and that the work rooms must be equipped with special ventilation systems to ensure that any poisonous phosphines can be effectively exhausted. In addition, the resulting products are of an intensely brown color and therefore are, practically speaking, unsuitable for coloring purposes except for black dyeing with soot black of a very high covering power. The systems employing elemental phosphorus therefore do not represent a satisfactory solution.

It is therefore an object of the present invention to provide flame retardant polyamides without the above-mentioned disadvantages.

It is a further object to provide an agent for inducing flame retardancy without the disadvantages previously mentioned.

A still further object of the instant invention is to provide flame retardant polyamides which are thermoplastically moldable and processable at temperatures essentially over 250° C.

Another object of the invention is to provide flame retardant polyamides in which the electrical properties of components molded therefrom are essentially unchanged compared to the same component molded from unmodified polyamide.

Another object is providing a flame retardant polyamide which may be easily colored for example by the direct addition of pigments to the melt.

Still another object is to provide a flame retardant polyamide which does not lose its flame retardancy on exposure to warm water.

SUMMARY OF THE INVENTION

Surprisingly, flame retardant, thermoplastically processable polyamide molding materials have now been found, which do not have the above-mentioned disadvantages.

Thermoplastically processable polyamides (also mixtures and blends with further thermoplasts) are rendered flame retardant by means of a new flame retarding agent: the conversion product of 1 mol cyanuric acid with 2 moles of a triazine base containing —$NH_2$ group(s). This is advantageously effected by homogeneously incorporating an intimite mixture of 1 mol melamine-cyanurate (1:1) and at least 1 mol of a —$NH_2$ group(s) containing triazine base into the aforementioned polyamide(s), whereby the above-mentioned conversion product is formed therein in situ.

The compounds and compositions of the present invention are especially advantageous in that:

they have very god self-extinguishing properties or flame retarding effect;

the conversion product is very heat resistant; therefore, its incorporation is also possible above 270° C., and therefore, it is particularly suitable for the technically important polyamide 66;

they are water resistant; therefore, the flame retarding effect is retained in polyamide thermoplasts even after several hours in boiling water; and only slight changes in the properties of polyamide thermoplasts (appearance, mechanical and electrical properties) are caused by this new flame retarding agent.

DETAILED DESCRIPTION OF THE PREFERRED EMBODIMENT

The polyamide molding materials according to the instant invention are characterized in that they comprise a thermoplastically processable polyamide or polyamide mixture of a blend of polyamide with a further thermoplastically processable plastic and the conversion product of 1 mole of cyanuric acid with 2 moles of a —$NH_2$ group containing triazinyl base.

The triazinyl bases of this invention are those of formula I:

wherein $R^1$ and $R^2$ are individually —$NH_2$, or an organic residue, or —$NHR^5$ wherein $R^5$ is an organic residue which may be the same or different from $R^1$ or $R^2$. If multinuclear triazinyl compounds are used they contain preferably 2–15 triazinyl nuclei. These multinuclear groups are preferably linked via —NH— or —$NHCH_2NH$—.

It is especially advantageous that as many triazinyl rings as possible still contain free amine groups. Amine groups of different nuclei can convert with one cyanuric acid. The polynuclear compound can react with several cyanuric acid molecules. Cyanuric acid can also react with a mononuclear triazine compound, mainly melamine and a polynuclear molecule. Some possible addition compounds are sketched below.

R is preferably —NH₂ or a link via —NH— or —NH—CH₂—NH— to other mono- or polynuclear triazinyl compound(s), preferably the triazinyl compounds sketched in the examples given above.

It is preferable that the non-flammable material comprise from about 97 to about 60 parts by weight of polyamide and about 3 to about 40 parts of the above-mentioned conversion product.

Mono and polynuclear triazinyl bases useful in this invention, such as melamine, melam and melem obtained by thermic condensation of melamine with the elimination of NH₃ as well as melamine-formaldehyde compounds, are described in Kittel: "Lehrbuch der Lacke und Beschichtungen", (1971) p.375 ff.

All thermoplastically processable polyamides may be employed for the instant invention. Particularly advantageous are high-melting polyamides as well as high viscous polyamides which require high processing temperatures. Relevant examples include the polyamide of isophthalic acid and hexamethylene diamine, polyamide 66, (the polyamide of hexamethylene diamine and adipic acid), transparent polyamides according to U.S. Pat. No. 4,232,145 (or DE OS No. 26 42 244), as well as generally all transparent polyamides with glass transition temperatures over approximately 150° C. Useful polyamide mixtures include those of polyamide 66 with other polyamides generally; in particular with transparent polyamides having a glass transition point over approximately 150° C. or mixtures of amorphous polyamides with glass transition points over 150° C., with any other type of polyamide.

The transparent polyamides of U.S. Pat. No. 4,232,145 are copolyamides having glass transition temperatures of 140° to 170° C. consisting essentially of the polymeric condensation product of (a) a diamine of the formula wherein R₆ and R₇ are independently selected from the group consisting of hydrogen and methyl, n is an integer from 0 to 6, and wherein each cyclohexane ring may be partially or wholly substituted with methyl groups;

(b) an approximately stoichiometric amount, based on the amount of component (a), of a dicarboxylic acid or acid mixture consisting of from 50 to 100% of isophthalic acid, from 0 to 50% (mol or by weight) of terephthalic, and from 0 to 15 mol% of at least one other polyamide forming dicarboxylic acid; and (c) 30 to 40% by weight, based on the total weight of components (a), (b) and (c), of a further polyamide forming component. Said further polyamide forming component comprising (i) an ω-amino acid or a lactam thereof having more than 9 carbon atoms; or (ii) a salt or a stoichiometric 1:1 mixture of an aliphatic dicarboxylic acid which is preferably of the formula HOOC—(CH₂)$_p$—COOH, and an aliphatic diamine which is preferably of the formula H₂N—(CH₂)$_q$—NH₂; the average number of carbon atoms between the amide groups or between each pair of amide-forming groups being at least 9, the number of carbon atoms between the amide-forming groups being at least 6 and, when component (b) is not 100% isophthalic acid, the sum of the weights of the aliphatic dicarboxylic acids and of component (c) being from 30 to 40% by weight, based on the total weight of components (a), (b) and (c).

Advantageous polyamide blends include intimate mixtures of two or more polymers wherein at least one component of the blend is a polyamide. Such blends comprise a polyamide and a polyester; for example, polyamide 66 with polybutene terephthalate or polyethylene terephthalate. Also useful are blends of polyamide with a polyesteramide, a polyamide-elastomer (according to DE No. 29 32 234), a polyurethane, a polyamideimide, a polycarbonate, a polyestercarbonate, and poly(ethylene)vinylacetate, which may be also partially or totally hydrolyzed, or any polyolefin, excluding those polyolefins containing double-bonds. For example, a blend of polyamide 66 with polyethylene terephthalate and a copolymer of ethylene and (meth)acrylic acid (ester) is of value. The (meth)acrylic acid can be partially neutralized and contain metal ions such as sodium, zinc, calcium, magnesium, lead, etc. in place of the acid protons.

Such olefinic polymers are known as "ionomers". Further examples of polymer blends are those of polyamide 6, 66, or 12 with a transparent polyamide (e.g. according to U.S. Pat. No. 4,232,145), as well as an ionomer resin or polyamide 12 with polyethylene terephthalate and an ionomer resin. Another example is polyamide 12 with polyethylene terephthalate and an ionomer resin.

In general, suitable further thermoplasts are free of double bonds, have aromatic and/or heterocyclic nuclei and have polymer chains containing one or more of oxygen, nitrogen, sulfur and phosphorus. The further thermoplasts may exhibit high melting points, high melt-viscosity and good heat stability.

The polyamides, polyamide mixtures, or polyamide blends may and do, of course, contain the conventional processing aids such as lubricants, mold-release agents, nucleating agents, and stabilizers, and may also contain fillers and reinforcing agents or plasticizers. Examples are metal stearates (Mg—, Ca—, Zn—, etc.), amides and polyethylene waxes; heat stabilizers, e.g. the copper containing combinations familiar from polyamide stabilization or sterically hindered phenols; light stabilizers, such as benzotriazoles and hindered amines; finely dispersed soot; fillers such as kaolin; reinforcing agents, e.g. glass, pigments, and dyes; or additional flame retardants. It goes without saying that these additives may be employed in various combinations as is known to the person of ordinary skill in the art.

The active agent of the instant invention, especially the dimelamine-cyanurate, has extraordinarily interesting properties. It should be present in as finely dispersed form as possible. The fact that it has a high processing stability permitting excellent processing and, as the main effect, imparts self-extinguishing properties to polyamide 66 as well as to other high-viscosity polyamides, is surprising. Furthermore, if the concentration in the polyamide is suitably selected, the flame retarding agent remains effective even if the finished parts are subjected to hot water. In addition, the mechanical and electrical properties of the thermoplastic materials are almost unaffected. The processability, in particular the injection molding cycle, of polyamides modified with this compound is excellent. Pigmenting in many colors is simple as the flame retarding agent has only a slight color.

The conversion product, mainly dimelamine-cyanurate, is produced preferably during incorporation into the polyamide. Approximately 3 to approximately 40 parts by weight, preferably about 3 to about 30 parts by weight, of an intimate homogeneous mixture of a triazinyl base-cyanurate, e.g. melamine-cyanurate (in a molar ratio of 1 to 1) is incorporated with at least one mole of triazinyl base, preferably melamine, directly into 97 to approximately 60 parts by weight of the polyamide melt. The preferred polyamide is polyamide 66.

For this purpose, the first step is the manufacture of the melamine cyanurate according to the aforementioned DE OS No. 27 40 092 and grinding it to the finest possible particle size. The compound formed is homogeneously mixed with finely ground melamine, e.g. in an intensive mixer such as the Henschel mixer. The mixture is then incorporated into the polyamide melt through intensive kneading, e.g. in a double-screw-extruder such as the ZSK 30 manufactured by Werner and Pfleiderer, Stuttgart/FRG, or a Buss Co kneader, from Buss, Pratteln, Switzerland. With a polyamide of low melt viscosity this can be done without further additives. If a polyamide of medium or high melt viscosity is used, the addition of an internal lubricant is recommended, e.g. a so-called metal soap (calcium stearate or magnesium stearate).

Other effective processing aids are amides such as the amide from tridecyl-amine and lauric acid, bisamides such as ethylenebisstearamide, bis ureides or simple amines with long alkyl chain(s) which can be linear or branched containing, for example, approximately 12 to approximately 30 carbon atoms. Suitable processing aids are given in the previously mentioned DE OS No. 27 40 092.

The triazinyl base-cyanurate, preferably melamine-cyanurate 1:1, is incorporated into the polyamide preferably in finely ground form. It affords the polyamide material flame retardant properties. The major advantage of the use of the flame retardant of this invention is the improved melt stability, so that polyamides of medium and high viscosity (e.g. polyamide 66 and 6) can be processed without problems. During processing sublimation effects are rarely and minimally encountered and, even under conditions of high temperature and humidity, only a small degree of blooming is to be observed. Therefore the electrical properties remain essentially unchanged. As a further important advantage, the flame retardant properties are only slightly affected by long contact with warm water.

While in the melamine-cyanurate 1:1 compound, only a single functional group of the cyanuric acid has reacted with one —NH₂ group of melamine, a second functional group of the cyanuric acid reacts with another melamine in the case of the 1:2 compound. In the case where a multinuclear triazine is used, two different nuclei of the same multinuclear compound may react with two hydroxy groups of the cyanuric acid.

As the cyanuric acid appears in the keto and enol form, the linkage can be formulated in two ways, namely:

The form in which the linkage chiefly exists is difficult to define. However, the result, namely the fact that a stabilization of the flameretarding system is achieved through the additional linkage, enabling problem-free processing of polyamides which require high processing temperatures, particularly, polyamide 66, is important.

BRIEF DESCRIPTION OF THE DRAWING

The fact that a linkage is created is clearly depicted by the unequal course of the DTA curves (see FIG. I)

Figure 1:
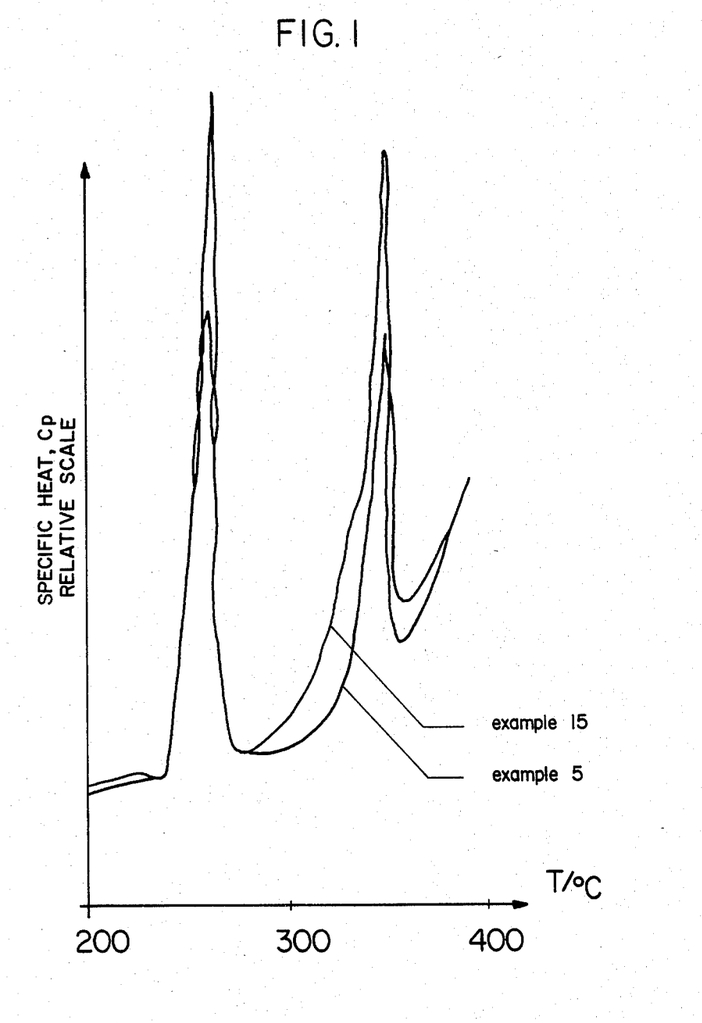

according to example 5 and comparison example 15 in the critical range of 280° to 350° C. It becomes apparent therefrom that, when using melamine-cyanurate 1:1, decomposition combined with endothermic caloric effects proceeds immediately above the melting point of the polyamide 66. However, the case of the conversion product of the instant invention produced in situ, such reactions do not occur until significantly higher temperatures of over 300° C. are reached.

When aqueous solutions of melamine and cyanuric acid are mixed, even if an excess of melamine is present, the 1:1 compounds precipitates as it is the least soluble in this medium. The process for the production of the 1:2 compound via mixing of melamine-cyanurate 1:1 with finely pulverized melamine is effected most advantageously directly in situ; i.e. in the polyamide melt. This is also possible when the melamine is replaced by other triazinyl nuclei containing $NH_2-$ groups. This procedure has proven to be the simplest and cheapest method. However, two points must be observed: first, an intensive premixing of the compounds and second, an apparatus permitting highly effective kneading of the polyamide melt bringing the additives in intimate contact, are necessary. When using highly viscous polyamides, it is therefore advisable to include an effective internal lubricant.

Polyamide materials produced in this manner can subsequently be thermoplastically transformed into finished parts without any problems.

If the resulting objects are subsequently conditioned in warm water, or if a longer than usual period of contact with warm water is experienced, the second linkage of the cyanuric acid with the melamine is broken and a mole of melamine is released. This can be visualized as follows: instead of the melamine, water is deposited via a hydrogen bond to the cyanuric acid and the melamine is displaced. This is in accordance with the fact that cyanuric acid crystallizes out of water in the form of the dihydrate. The released melamine can now be extracted with warm water. The remaining cyanurate 1:1 compound is stable towards splitting-up with water, of low solubility, and thus remains in the polyamide matrix as an effective flame retarding agent.

If, e.g., polyamide 66 is modified for flame retardancy with 10 weight % of the dimelamine-cyanurate compound according to our invention and the product is subsequently exposed to warm water, the flame retarding effect is retained because of the melamine-cyanurate 1:1 still in the matrix.

In cases where extractable melamine is not desirable, it can be replaced by oligomers, multinuclear melamine compounds of low solubility in water, e.g. 2-15, preferably 2-10, nuclear melamine condensates. The products must be condensed so that at least 1 $NH_2$ group remains available for the formation of the addition compound with the cyanuric acid.

The following examples are illustrative and do not limit the invention.

Abbreviations used:
Mel—melamine
MC—melaminecyanurate
PA—polyamide
PBTP—polybutyleneterephthalate
Other abbreviations used in the tables are explained on the corresponding pages.

EXAMPLES

General Procedure

In the following examples and comparison examples the flame retarding agents Mel, MC, or MC and Mel as mixtures, were incorporated into various polyamides or polyamide mixtures or polyamide blends.

Before incorporating the flame retarding agent according to the invention, the MC and Mel mixture was thoroughly premixed in finely pulverized form in an intensive mixer, e.g. the Henschel laboratory mixer.

To achieve optimum distribution of the flame retardant agent during the mixing process, an internal lubricant was usually added. A double screw extruder, Werner & Pfleiderer, Stuttgart/FRG type ZSK 28 was used to incorporate the additives.

The incorporation of the flame retarding agent was generally carried out as follows: the chips of polyamide, or of polyamide and the further thermoplastic material, were first mixed in the dry state with the finely pulverized internal lubricant and then with the flame retarding agent. This mix was subsequently fed into the double screw extruder through a feed hopper, whereby the double screws were kept at a speed of approximately 150 rpm, and the melt in the extruder processed at a temperature of approximately 280° C. It was released in the form of a strand, conducted through a water cooling bath and subsequently granulated. The resulting chips were dried to a water content of approximately 0.05 weight % and then processed on a plunger-type injection moulding machine to flat rods 12 cm long and 1.3 cm wide. The thickness of the rods was 0.8, 1.6 or 3.2 mm (corresponding to 1/32, 1/16 or ⅛"). Burning behavior was then determined according to the UL 94 method (standard of Underwriters Laboratories Inc., Melville, United States).

EXAMPLES 1-10 (TABLE 1)

The procedure as described in "General Procedure", whereby MC or mixtures of MC with Mel were incorporated into PA 66 or other polyamides or a blend of PA with PBTB was followed.

The results are summarized in Table 1. They show that with MC or mixtures of Mel and MC which are under the stoichiometric ratio of 1 mol Mel per MC, no perfectly processable PA 66 material can be produced. If the ratio of 1:1 is achieved (or slightly exceeded for practical reasons) perfectly molded parts of PA 66 can be obtained. Their self extinguishing properties depend on the amount of flame retarding agent used, and they achieve UL 94 classification VO, even with 10 weight % flame retarding agent (example 5) and even on rods of 0.8 mm thickness.

Examples 6-10 refer to further polyamides or polyamide blends that are processable only at a high melt temperature. All the corresponding flame retardant formulations could be processed into perfect test parts with good, self-extinguishing properties.

Abbreviations used in the following tables 1 and 2:
Cas—calcium stearate
A—aliphatic primary amine (mol wt 267)
V2—V2 class according to UL, good extinguishing properties
VO—VO class according to UL, best self estinguishing class
NK—non-classifiable, i.e. poor effect The expressions V2, VO, NK correspond to the official UL Standard for Tests for Flammability of Plastic Materials for Parts in Devices and Appliances.

Table 2 shows that Mel is a water-extractable flameproofing agent, while if the system according to the present invention (Example 12) is used, the flame re-

| Example | Polymer TYPE | Specification | Flame retarding agent in weight % Mel | MC | Mel:MC | Processing aids type | wt. % | Fication test object, thickness, mm 0.8 | 1.6 | 3.2 | Remarks |
|---|---|---|---|---|---|---|---|---|---|---|---|
| 1 | PA-66 | medium-viscosity injection moulding type | | 10 | | CaS | 0.2 | | | | Foaming and serious surface flaws during processing |
| 2 | PA-66 | medium-viscosity injection moulding type | 0.5 | 8 | 1:7.9 | A | 0.5 | | | | Surface flaws |
| 3 | PA-66 | medium-viscosity injection moulding type | 2.0 | 8 | 1:1.97 | A | 1.0 | | | | Surface flaws |
| 4 | PA-66 | medium-viscosity injection moulding type | 3.0 | 5 | 1.22:1 | A | 1.0 | V2 | VO | VO | Flawless surface up to material temperature of 300° C. |
| 5 | PA-66 | medium-viscosity injection moulding type | 4.0 | 6 | 1.35:1 | CaS | 0.3 | VO | VO | VO | Flawless surface up to material temperature of 300° C. |
| 6 | Amorph' CoPA acc. to US42321 45, example 23 | high viscosity for injection moulding and extrusion | 4.0 | 7 | 1.16:1 | CaS | 0.3 | V2 | VO | VO | Flawless surface up to material temperature of 300° C. |
| 7 | PA of isophthalic acid + diaminohexane | high viscosity | 4.0 | 6.0 | 1.35:1 | CaS | 0.3 | | VO | VO | Flawless surface up to material temperature of 300° C. |
| 8 | CoPA of 85% caprolactam + 15% laurolactam | high-viscosity extrusion tupe | 4.0 | 7.0 | 1.16:1 | CaS | 0.3 | | VO | VO | Flawless surface up to material temperature of 300° C. |
| 9 | Pa-66, 80% as ex. 1 PBTP 20% inj. moulding type | | 4.0 | 7.0 | 1.16:1 | CaS | 0.3 | | VZ | VO | Flawless surface up to material temperature of 300° C. |
| 10 | Amorph' PA acc. to ex. 6 4 PA 66 acc. to ex. 2 weight ratio 1:1 | — | 4.0 | 7.0 | 1.16:1 | CaS | 0.3 | V2 | VO | VO | Flawless surface up to material temperature of 300° C. |
| 20 | PA 6.6 | medium viscosity injection moulding type | 4.0 | 6.0 multi nuclear triazine | | | | | VO | | flawless surface up to material temperature of 290° |

COMPARISON EXAMPLE 11 AND EXAMPLE 12 (TABLE 2)

12% Mel was incorporated into a PA 66 according to Examples 1-5, of which flat rods 1.6 mm thick were subsequently produced for the burning test. The material shows self-extinguishing properties corresponding to UL 94 VO. These rods, and rods from example 5, were then immersed in boiling water for 4 hours and then subjected to a burning test according to UL 94. The results are compiled in the following table:

TABLE 2

| Example No. | PA-type | Flameproofing agent Mel | MC | UL classification, 1.6 mm flat rod |
|---|---|---|---|---|
| 11 comp. example | PA 66 corresp. to ex. 1-5 | 12 | — | NK |
| 12 example | | 4 | 6 | VO | tarding effect is retained even after a longer period of contact with boiling water.

EXAMPLE 13

Test pieces were moulded of PA 66 modified according to Example 5, and the mechanical properties were compared with those of the same PA 66 base material but without any fire retardant modification.

It became apparent that the polyamide 66, modified according to the instant invention and corresponding to example 13, does not differ significantly from the unmodified PA 66. It possesses practically identical tensile strength values corresponding to DIN standard 53455, and has the advantage of increased stiffness (DIN 53457 and DIN 53452) and hardness (DIN 53456). On the other hand, the impact strength is somewhat lower (DIN 53453). Of importance in this context is that very good impact strength (unnotched) is achieved in the conditioned state. There were no breaks (DIN 53453).

In addition, the burning test according to ASTM D 2863 was carried out on the modified PA 66 of the present invention with a value for % $O_2$ of 33 (LOI value).

TABLE 3

| Characteristic | Standard | Unit | PA66 acc. to inv. corresp. with ex. 5 | | Pure, medium-viscosity PA-66 | | Ex. 20 | |
|---|---|---|---|---|---|---|---|---|
| | | | dry | cond. | dry | cond. | dry | cond. |
| 1. tensile strength at yield | DIN 53455 | N/mm² | 90 | 45 | 85 | 55 | | |
| 2. elongation at yield | " | % | 25 | 25 | 25 | 25 | | |
| 3. tensile strength at break | " | N/mm² | 85 | 50 | 85 | 45 | 130 | 50 |
| 4. elongation at break | " | % | 5 | 25 | 15 | 175 | | |
| 5. E-modulus, tension | DIN 53457 | N/mm² | 3000 | 1700 | 3600 | 1600 | | |
| 6. flexural strength | DIN 53452 | N/mm² | 130 | 55 | 120 | 50 | | |
| 7. modulus of elasticity | " | N/mm² | 3000 | 1300 | 2500 | 950 | 3000 | 1300 |
| 8. Ball indentation hardness, 30" | DIN 53456 | N/mm² | 130 | 65 | 95 | 50 | | |
| 9. Shore hardness D | — | — | 83 | 75 | 85 | 75 | | |
| 10. Impact strength 23° | DIN 53453 | kJ/mm² | 50 | oB | oB | oB | 60 | oB |
| 11. Impact strength (notched) 23° | " | kJ/mm² | 2 | 5 | 4.5 | 12 | 3.4 | 10 |

EXAMPLE 14 (=PA ACCORDING TO EXAMPLE 5) AND COMPARISON EXAMPLE 15

In Example 14, the processability of PA 66 with flame retarding agent corresponding to example 5 was compared with PA 66, containing 10% MC as the flame retarding agent (Comparison Example 15). For this purpose, plates with an edge length of 10 cm and a thickness of 3 mm were injection moulded at polyamide melt temperatures between 270° C. and 300° C. and then compared according to their surface quality.

The results are compiled in Table 4. They show that, using the flame retarding agent according to the invention and up to a material temperature of 300° C. (the highest tested and normally used temperature for the processing of PA 66), plates with perfect surfaces can be obtained. It was not possible to obtain perfect plates through modification of the same PA 66 type with MC alone. It should also be noted that the plates with serious surface flaws are also mechanically unacceptable, i.e. quite rigid.

TABLE 4

| Example | PA-melt temperature °C. | Assessment of the test objects |
|---|---|---|
| 14 | 275 | very good |
| | 280 | very good |
| | 290 | very good |
| | 300 | very good |
| 15 | 275 | slight surface flaws |
| (Comp. Example) | 280 | distinct surface flaws |
| | 290 | serious surface flaws |
| | 300 | very serious signs of disintegration |
| 20 | up to 290° | excellent |

EXAMPLES 16–19

In the following Examples or Comparison Examples according to Table 5, 30% mineral was incorporated into PA 66 (injection moulding type of medium viscosity). In Examples 17 and 19, the flameproofing system according to the present invention in a concentration of 15 weight % was also included in amounts of 9 weight % MC and 6 weight % Mel. At a melt temperature of 280°–290° C., rods were produced under conditions corresponding to examples 1–10, and their self-extinguishing properties were determined according to UL 94.

On each rod (all had perfect surfaces), the classification VO was obtained down to a layer thickness of 1.6 mm. At the same time, small DIN bars were injection molded the flexural bending and impact properties thereof were determined according to DIN 53452 and DIN 53453.

As shown in Table 5, these self-extinguishing formulations based on PA 66 are significantly stiffer than PA 66 modified only with flame retarding agent.

TABLE 5

| Example No. | Mineral | Impact strength DIN 53453 | Flexural strength DIN 53452 dry | Modulus of elasticity DIN 53452 dry | Ball indentation hardness DIN 53452 dry |
|---|---|---|---|---|---|
| 16 | Alum. silicate, ground to av. ⌀ of 1.2μ, kaoline type of Messrs. Englehard, Edison N.J./USA | 20 | 205 | 4700 | 190 |
| 17* without flame retarding agent | as in Example 16 above | 40 | 197 | 4500 | 185 |
| 18 | Calcium metasilicate av. grain size of 10μ of Messrs. Interpan, | 16 | 220 | 4900 | 190 |

TABLE 5-continued

| Example No. | Mineral | Impact strength DIN 53453 | Flexural strength DIN 53452 dry | Modulus of elasticity DIN 53452 dry | Ball indentation hardness DIN 53452 dry |
|---|---|---|---|---|---|
| 19* without flame retarding agent | Willsboro/USA as in Example 18 above | 21 | 205 | 4600 | 187 |

\* = comp. example

EXAMPLE 20

A multi-nuclear triazine compound and MC were used to form the conversion product. The multi-nuclear triazine was formed from melamine by thermal elimination of ammonia and consists essentially of about 40% melem and about 60% mellon with small amounts of melam.

An intimate mixture of fine powder of this multi-nuclear triazine (~40% by weight) and MC (~60% by weight) was made and incorporated into PA 66 (medium viscous injection molding polyamide) in an amount of 10% by weight as in the preceeding examples. Perfect, flawless injection molded bodies are produced from this formulation up to 290° C. (see Table 4).

In the UL-94 flame test (Table 1), flat rods of 0.8 mm thickness was found to be in the VO class, the best self-extinguishing class. This composition, when injection molded at 280° C., exhibits mechanical values as shown in Table 3. These results are extremely small variations from unmodified PA-66, and intermediate between unmodified PA and PA as modified in Example 5.

Extraction of the conversion product of this example from PA 66 by cold and hot water was compared to that of Example 5. Modified PA of Examples 5 and 20 were granulated and extraction was carried out in a Soxlet apparatus using boiling water. The extracted portion was determined after 24 hours and after 1 week. The results are in Table 6 below.

Flat rods of PA modified according to Example 20 were also tested by immersing them in boiling water at a bath ratio of 1:100, the water being replaced daily.

After 1 week of such treatment the rods were removed and flame tested according to UL 94 and were still within the VO class.

TABLE 6

|  | Ex. 20 Modified PA | Ex. 5 Modified PA |
|---|---|---|
| Conversion product originally present | 10% | 10% |
| Conversion product left after 24 hrs. | 8.5% | 5.0% |
| Conversion product after 7 days | 7.5% | 3.5% |

For comparison purposes, 10% melamine in melamine modified PA-66 is almost entirely extracted in 4 hrs. under similar conditions. On the other hand, with 1:1 melamine cyanurate modified PA-66, the flame retardant agent is only slightly extractable, but yields a product with unsatisfactory temperature resistance.

What we claim is:

1. A flame retardant thermoplastically processable material comprising
    (A) at least one thermoplastically processable polyamide,
    (B) a further thermoplast in an amount from 0% to about 45% by weight of the material, and
    (C) a flame retarding agent which is a condensation product of
        (i) cyanuric acid and
        (ii) melamine, there being at least two molecules of melamine per molecule of cyanuric acid.
2. A flame retardant thermoplastically processable material comprising
    (A) at least one thermoplastically processable polyamide,
    (B) a further thermoplast in an amount from 0% to about 45% by weight of the material, and
    (C) a flame retarding agent which is a condensation product of
        (i) 1 molecule of cyanuric acid and
        (ii) two molecules of melamine.
3. A flame retardant thermoplastically processable material according to claim 2 wherein said polyamide is polyamide 66.
4. A flame retardant thermoplastically processable material according to claim 2 wherein there is 0% of said further thermoplast present.
5. The condensation product of claim 1, 2, 3, or 4.
6. The material of claim 1, wherein said thermoplastic processable polyamide is selected from polyamide 6, polyamide 6.6, polyamide 12, polyamide 66, a polyamide of isophthalic acid and hexamethylenediamine, transparent polyamides with glass transition temperatures over approximately 150° C., and transparent polyamides which are copolyamides having glass transition temperatures of 140° to 170° C. consisting essentially of the polymeric condensation product of wherein $R_1$ and $R_2$ are of 140° to 170° C. consisting essentially of a polymeric condensation product of
    (a) a diamine of the formula wherein $R_6$ and $R_7$ are independently selected from the group consisting of hydrogen and methyl, n is an integer from 0 to 6, and wherein each cyclohexane ring may be partially or wholly substituted with methyl groups;
    (b) a substantially stoichiometric amount, based on the amount of component (a), of a dicarboxylic acid or acid mixture, consisting of from 50 to 100% of isophthalic acid, from 0 to 50 mol or weight % of terephthalic acid, and from 0 to 15 mol% of other polyamide-forming dicarboxylic acid or acids; and (c) 30 to 40% by weight, based on the total weight of components (a), (b) and (c), of a further polyamide-forming component which is selected from the group consisting of amino lauric acid, laurolactam and aminoundecanoic acid, some of said group may be replaced by a member of the class consisting of aliphatic dicarboxylic acids and aliphatic diamines, stoichiometric mixtures of aliphatic dicarboxylic acids and aliphatic diamines, and blends of said salts and mixtures; said member subject to the conditions that the average number of carbon atoms per amide group or between each pair of amide forming groups is at least 9, that the minimum number of carbon atoms between the amide forming groups being at least 6 and, when component (b) is not 100% isophthalic acid or isophthalic acid/terephthalic acid mixture, the sum of the weights of the other polyamide-forming dicarboxylic acids in (b) and of (c) must be from 30 to 40% by weight, based on the total weight of components (a), (b) and (c), said product having a melt viscosity of 2000 to 15000 poises at about 300° C.

7. The material of claim 1, 2, 3, 4, or 6 wherein the flame retarding agent is present from about 3% to about 40% by weight of said material.

8. The material of claim 1, 2, 3, 4 or 6 wherein (A) and (B) together are from about 60% to about 97% by weight of said material.

9. The material of claim 1, 2 or 6 wherein said thermoplastically processable polyamide has a processing temperature in excess of about 260° C.

10. The material of claim 1, 2, 3, 4 or 6 wherein more than one polyamide is present as a mixture, said mixture being of
   (a) polyamide 66 and transparent polyamide having a glass transition temperature in excess of about 150° C. or
   (b) amorphous polyamide having a glass transition temperature in excess of about 150° C. and any other polyamide.

11. The material of claim 1, 2, 3, 4 or 6 wherein said further thermoplast is at least one selected from an olefin copolymer, olefin ionomer, polyester, polyesteramide, a polyamide-elastomer, polyurethane, polyamide-imide, polycarbonate, polyestercarbonate, poly(ethylene) vinyl acetate.

12. The material of claim 11 wherein the polyester is polybutylene terephthalate or polyethylene terephthalate.

13. The material of claim 11 wherein said olefin copolymer and olefin ionomer are copolymer and ionomer respectively of ethylene and (meth)acrylic acid.

14. The material of claim 1, 2, 3, 4 or 6 further comprising at least one of a processing aid, a nucleating agent, a stabilizer, a filler, a reinforcing agent, a plasticizer, a lubricant, a heat stabilizer, a light stabilizer and a further flame retardant.

* * * * *